United States Patent [19]

Holl et al.

[11] 4,238,902
[45] Dec. 16, 1980

[54] ANIMAL TRAP

[76] Inventors: Gordon D. Holl, Kenas Rd., North Wales, Pa. 19454; Gene A. Marcolina, 8803 Cheltenham Ave., Wyndmoor, Pa. 19118

[21] Appl. No.: 31,510

[22] Filed: Apr. 19, 1979

[51] Int. Cl.³ .............................................. A01M 23/18
[52] U.S. Cl. ..................................................... 43/61
[58] Field of Search ............................... 43/61, 60, 58

[56] References Cited

U.S. PATENT DOCUMENTS

| 691,301 | 1/1902 | Tschantre | 43/61 |
| 1,454,998 | 5/1923 | Haege | 43/61 |
| 1,703,990 | 3/1929 | Daniels | 43/61 |
| 2,774,175 | 12/1956 | Maddocks | 43/61 |
| 2,803,918 | 8/1957 | Hall | 43/61 |
| 3,975,857 | 8/1976 | Branson | 43/61 |
| 4,144,667 | 3/1979 | Souza | 43/61 |

Primary Examiner—Nicholas P. Godici
Attorney, Agent, or Firm—George A. Smith, Jr.

[57] ABSTRACT

Simplified molding of a disposable plastic mousetrap is achieved by providing an elongated box and a triggerable closure hinged to the box along a hinge axis parallel to the direction of elongation. Shield means prevent access to the trigger from the exterior of the box, thereby requiring the mouse to enter the box before reaching the trigger.

12 Claims, 9 Drawing Figures

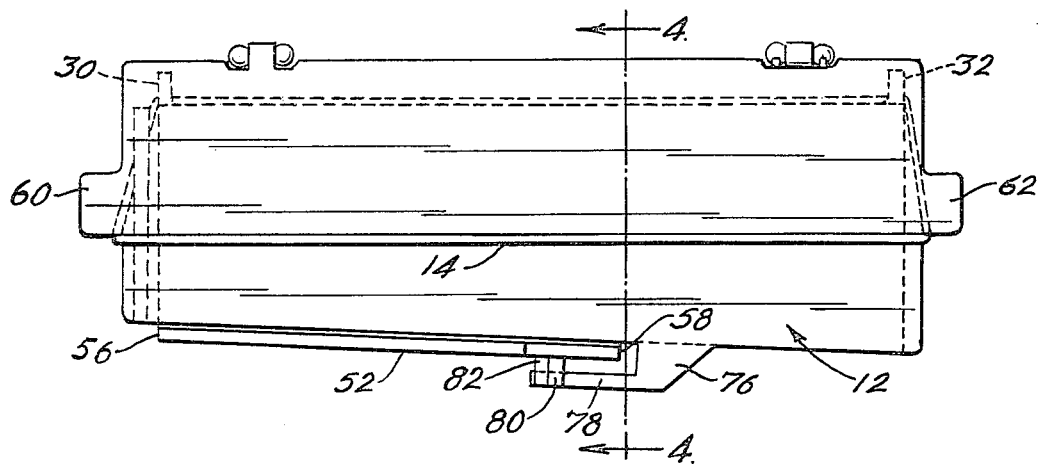
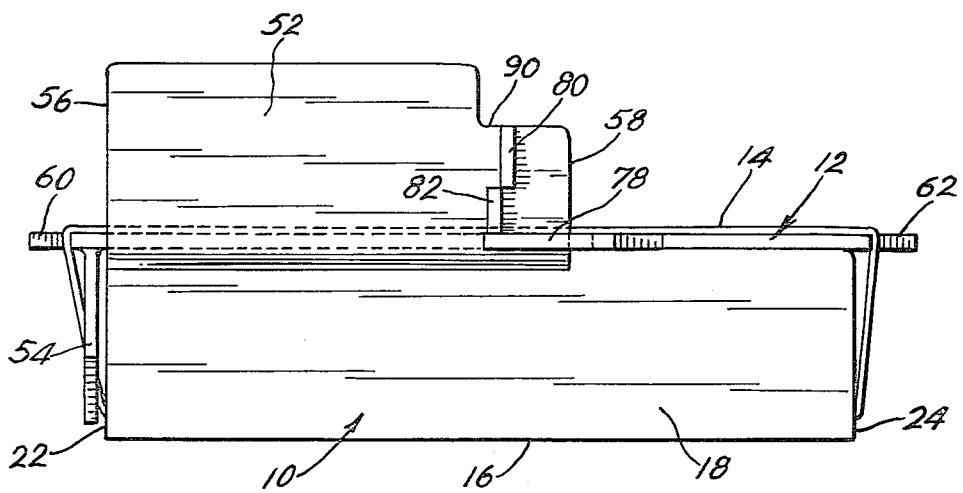
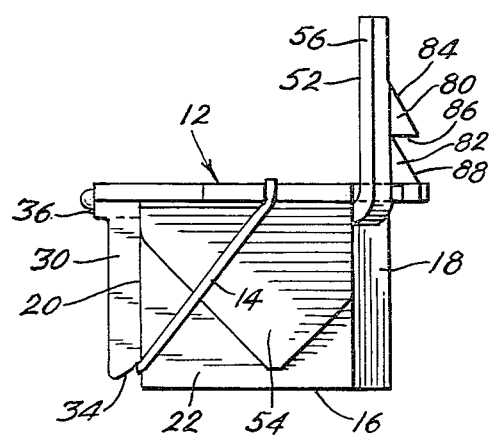
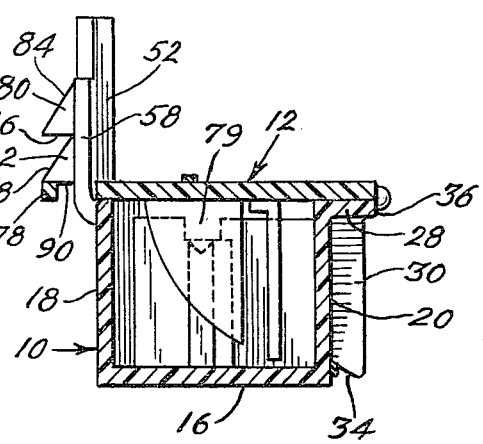

ANIMAL TRAP

SUMMARY OF THE INVENTION

This invention relates to animal traps, and relates particularly to traps of the type which operate by imprisoning the animal within an enclosure. The invention has particular utility in molded plastic mousetraps of the suffocation type. However, it is applicable to imprisonment traps of various sizes for trapping various kinds of animals.

Our U.S. Pat. No. 4,142,320, dated Mar. 6, 1979 describes a disposable plastic mousetrap comprising an elongated plastic housing having a swinging door at one of its ends, the door being biased toward a closed condition by a rubber band. In operation, the mouse enters the elongated housing through the opening at its end, and actuates a trigger near the opposite end of the trap to effect automatic closure of the door. The trigger is connected to the door through an articulated arm extending from the door to the far end of the trap, the arm being preferably molded integrally with the door. The trap configuration described in our U.S. Pat. No. 4,142,320 operates satisfactorily. However, certain manufacturing difficulties arise by reason of its elongated configuration, and also by reason of the need for an elongated trigger arm extending from the door to the far end of the trap. The trap configuration described in our patent is not well suited for larger molded traps in that the elongated configuration having an opening at one end requires a large and expensive mold for producing the larger sized traps.

The principal object of this invention is to provide a structurally simple imprisonment trap which is relatively inexpensive to mold, and which is reliable and effective in its operation. It is also an object of this invention to provide a trap configuration which is readily applicable to large-sized molded animal traps of the imprisonment type.

The trap in accordance with this invention comprises an elongated box having an opening extending substantially the full length of the box in the direction of elongation, means providing a closure of a size sufficient to close the opening substantially completely, hinge means connecting the box and the enclosure and arranged to allow the closure to swing from an open position in which an animal may enter the interior of the box to a closed position in which an animal within the box is substantially completely enclosed, and means for urging the closure toward the closed position. Animal actuable trigger means are provided adjacent one end of the box for temporarily holding the closure in its open position against the action of the urging means. The trigger means is movable when activated by an animal to permit the closure to move to its closed position under the action of the urging means. Shield means are provided for denying access to the trigger means to an animal except when the body of the animal is positioned so that, upon activation of the trigger, the closure is able to close under the action of the urging means and thereby enclose the animal within the enclosure.

The preferred form of the invention is characterized by the fact that the hinge axis is parallel to the direction of elongation of the trap.

The foregoing features, and others which will be set forth below in the detailed description, provide an entirely novel form of imprisonment trap, especially well adapted for production by injection molding, and reliable and effective in its operation. Various objects and advantages other than those specifically set forth above will be apparent from the following detailed description, when read in conjunction with the drawings.

BRIEF DESCRIPTION OF THE DRAWINGS

FIG. 1 is a top plan view of a trap constructed in accordance with a first embodiment of the invention, showing the closure in its closed condition;

FIG. 2 is a front elevation of the trap of FIG. 1;

FIG. 3 is a left side elevation of the trap of FIG. 1;

FIG. 4 is a vertical section taken on the plane 4—4 of FIG. 1;

DETAILED DESCRIPTION

The trap of FIGS. 1-7 consists of three principal elements, namely a box 10, a closure 12, and a rubber band 14, the rubber band being in the form of a loop, and serving as a means for urging the closure toward its closed position.

Figure 7:
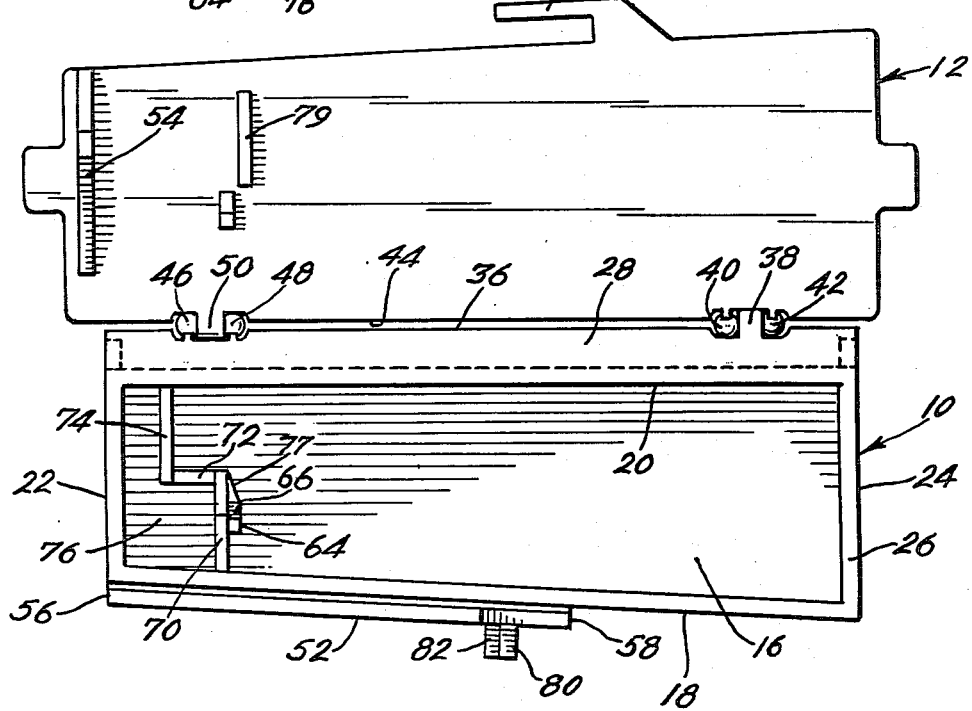
FIG. 7 is a top plan view of the trap of FIG. 6, showing the closure extended to an open condition beyond its set condition in order to illustrate the details of the trigger mechanism and of a bait compartment.

Box 10 comprises a bottom 16 and four sides 18, 20, 22 and 24, which are integral with and extend upwardly from the edges of bottom 16. As best shown in FIG. 7, bottom 16 of box 10 is elongated, and nearly rectangular in shape. Sides 18 and 20 are long in comparison with short sides 22 and 24, and all four sides extend substantially in the same direction upwardly from the edges of bottom 16 to form an open-topped box. Preferably, the upper or free edges of the four sides are at the same height, and form a continuous surface 26 adapted to be engaged by closure 12 to form an air-tight enclosure. An air-tight enclosure is essential when the trap is to be used to kill mice by asphyxiation. However, air tightness can be avoided by the provision of various air openings when it is desired to catch an animal without killing it.

While it is not illustrated in the drawings, a slight tapering of the sides of box 10 is desirable to facilitate removal of the box from a mold. However, such tapering is not essential in all cases.

As shown in FIG. 4, the upper edge of side 20 of the box is provided with a horizontal ledge 28, which extends outwardly from side 20. Rubber band retainers 30 and 32 are formed on the exterior of side 20, and on the underside of ledge 28 at locations adjacent short sides 22 and 24 (FIG. 1). Notches (e.g. notch 34 in FIGS. 3 and 4) at the lower ends of the retainers serve to retain the rubber band loop 14 in engagement with the lower edge of side 20.

As shown in FIG. 7, hinge elements are integrally formed on edge 36 of ledge 28. The hinge elements are preferably those of a conventional plastic snap hinge wherein a socket member on one element cooperates with a pair of balls formed on the other element. As shown in FIG. 7, a socket element 38 integrally formed on ledge 28 cooperates with a pair of balls 40 and 42 formed on edge 44 of closure 12. In a similar manner, a pair of balls 46 and 48 integrally formed on ledge 28 cooperate with a socket member 50 integrally formed on edge 44 of closure 12. These hinge members are formed in the conventional manner in a molding process wherein the box and the closure are formed separately. The cooperating hinge members are snapped together by taking advantage of the resilience of the plastic.

As the hinge members are located along and adjacent long side 20 of the box, the hinge axis is substantially parallel to the direction of elongation of the box. Closure 12 is of a size and configuration such that, when rotated about the hinge axis in the closing direction, it is able to engage all parts of surface 26 at the upper edges of the side walls of the box to form a complete closure.

As the top opening of the box extends substantially the full length of the box from the side 22 to side 24, means are provided to insure that the mouse or other animal is positioned within the box before the trigger is activated. This is accomplished by a pair of shields 52 and 54, which are secured respectively to the box and to the closure.

Shield 52 extends upwardly from the free edge of side 18 of the box, but is displaced outwardly with respect to side 18 by a short distance to allow clearance for movement of closure 12 against box surface 26. Preferably, shield 52 extends lengthwise from a location adjacent short side 22 to an intermediate location between the short ends of the box. Thus, shield 52 has one vertical edge 56 substantially aligned with side 22 of the box, and an opposite vertical edge 58 located near the midpoint between the end walls of the box. It will be observed at this point that the principal purpose of shield member 52 is to require the animal to enter the box by climbing over short side 24, or over that portion of long side 18 between edge 58 and short side 24.

Figure 6:
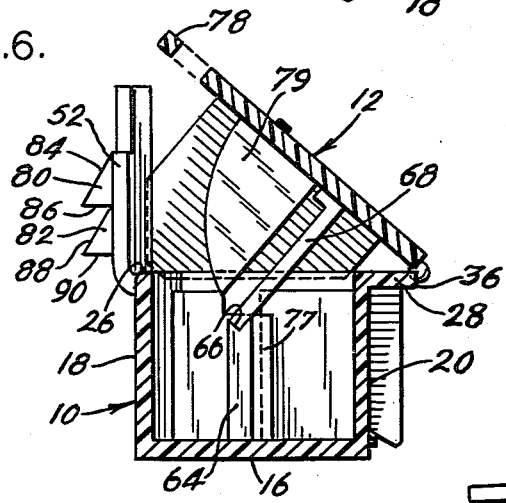
FIG. 6 is a vertical section taken on the plane 6—6 of FIG. 5.

Shield member 54, which is formed integrally on the closure serves to prevent the animal from entering the box by climbing over short side 22 when the trap is in the set condition illustrated in FIG. 6. Desirably, the configuration of shield member 54 is such that when closure 12 is in the set condition as shown in FIG. 6, shield member 54 substantially occludes the triangular space defined by the upper edge of short side 22, shield member 52 and closure 12. At the same time, shield member 54 is preferably configured as shown in FIG. 3 so that, when the closure moves to the closed condition illustrated in FIG. 3, shield member 54 does not interfere with the surface on which the trap rests or with any other part of the trap. In the preferred form of the invention, shield member 54 is positioned on closure 12 closely adjacent, but to the outside of side 22 of the box.

It should be observed at this point that the fact that shield member 54 is secured to the closure rather than to the box permits the rubber band loop 14 to extend from the retainers across the end faces of the box to retaining projections 60 and 62 at the ends of closure 12. As will be apparent from FIG. 1, rubber band loop 14 extends from retainer 30 across the face of the left-hand end wall of the box of retainer 60 of the closure, thence across the top of the closure to closure retainer 62. From closure retainer 62 the rubber band loop extends across the opposite face of the box to box retainer 32, and thence from box retainer 32 back to retainer 30 along the outside of side 20 of the box. The size and tension of the rubber band are preferably such as to exert a continuous closing force on the closing when the trap is in the set condition, and also exert at least a slight closing force on the closure when the trap is in the closed condition as illustrated in FIGS. 3 and 4.

Figure 5:
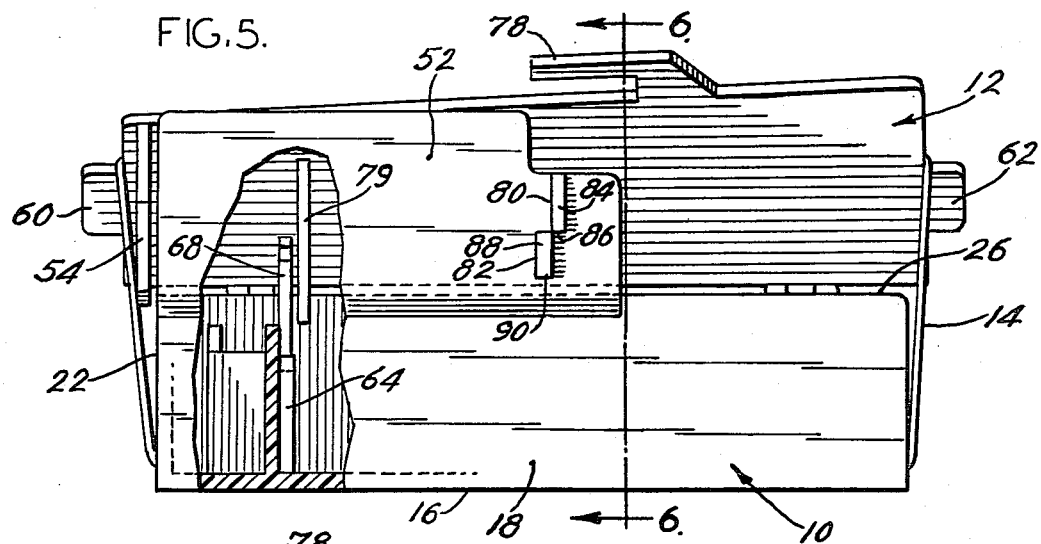
FIG. 5 is a partially cut-away front elevation of the trap of FIG. 1, showing the closure in its open position, and illustrating the trigger mechanism in its set condition.

The trigger mechanism, best seen in FIGS. 5 and 6, comprises a post 64 within the box adjacent short side 22, and extending upwardly from the floor of the box to a location well above the floor, but at least a short distance underneath surface 26. At the upper end of post 64 there is provided a V-shaped notch 66 adapted to receive an end of trigger bar 68, which is integral with and extends downwardly from closure 12. When the trap is in the set condition, trigger bar 68 engages V-shaped notch 66 of post 64 in the manner illustrated in FIG. 6. Post 64 is preferably integral with a wall 70, which is an interior wall within the box. Wall 70, together with walls 72 and 74 separate a bait compartment 76 at one end of the box from the remaining part of the interior of the box. Wall 70 reinforces post 64, and also requires movement of the trigger bar 68 toward short side 24 of the box in order to disengage the trigger mechanism to allow the closure to shut under the influence of rubber band 14. Trigger bar 68 is preferably at least slightly resilient in order that it can be moved by the animal away from V-shaped notch 66 in its effort to reach the bait within bait compartment 76. In order to prevent the animal from reaching the bait within bait compartment 76 without activating the trigger, an additional shield member 79 is provided on the underside of closure 12 as shown in FIG. 6.

A wedge-shaped ramp 77 is formed alongside post 64 to guide the lower end of trigger bar 68 into notch 66 during setting of the trap. As closure 12 is lifted during setting, ramp 77 exerts a camming action against the resilient trigger bar causing the trigger bar to ride up along the face of the post until it snaps into place in notch 66.

Wall 74 is intentionally not aligned with wall 70, but is rather connected thereto by lengthwise extending wall 72, in order to prevent the jaw of the animal attempting to activate trigger bar 68 from being caught between the trigger bar and the interior wall. This feature is of particular significance in the case of mice, which have a tendency to attempt to activate the trigger bar with their mouths.

The latch mechanism comprises a projection 76, which includes a resilient lengthwise-extending arm 78, integral with the edge of the closure opposite the hinged edge. Arm 78 cooperates with a pair of triangular projections 80 and 82 formed on the outside of shield member 52. Projection 80 is provided with a sloping camming surface 84, and a horizontal retaining surface 86. Latch member 82 is similarly provided with a sloping camming surface 88 and a horizontal retaining surface 90. Projections 80 and 82 are offset from each other in the horizontal direction to eliminate undercutting in order to facilitate removal of the box assembly from the mold. Retaining surface 86 of projection 80 is positioned to be engaged by projection 78 on the closure when the closure is in a nearly closed condition. Retaining surface 90 of projection 82 is positioned to be engaged by projection 78 of the closure when the closure is in a fully closed condition.

The provision of a pair of projections as opposed to a single projection corresponding to projection 82 is particularly significant in the case of a mousetrap designed, in accordance with the principles of our U.S. Pat. No. 4,142,320, so that the trap is shortened. In accordance with that patent, a mousetrap of the asphyxiation type can be shortened to save material and produce quicker asphyxiation of the mouse by taking advantage of the fact that mice tend to withdraw their tails when pinched. In accordance with the invention described in that patent, the trap is made sufficiently short so that when the door closes under the action of a rubber band, it pinches the mouse's tail, and the mouse withdraws its tail completely into the interior of the trap, whereupon the door closes completely. The same principles are applicable, and are in fact desirably applied, to the present trap. However, because the closure is at the top of the trap, a mouse whose tail is caught between the closure and an edge of the box will frequently exert an upward force on the closure with its back before it withdraws its tail into the box. Thus, it is important to prevent the mouse from escaping in this manner. The significance of projection 80 is that it prevents the mouse from escaping by pushing upwardly on the closure with its back before its tail is withdrawn into the trap, allowing projection 78 to move over camming surface 88 to engage retaining surface 90 of projection 82. In the operation of the trap, when the mouse finally pulls its tail into the interior of the trap, and relaxes its upward pressure on the closure, the rubber band urges the closure to its fully closed position, and projection 78 becomes engaged with retaining surface 90, whereupon the closure remains in its fully closed condition, and the mouse is asphyxiated.

Where the dimensions of the trap are such that the mouse's tail will be caught between the box and the closure, the upper edges of the walls of the box are desirably rounded, at least at the location at which the mouse enters the trap, in order to allow the mouse to pull in its tail more easily. The edges of the closure may also be slightly rounded for the same purpose. With rounded edges on the walls or the closure, or both, a stronger rubber band can be used without impairing the ability of the mouse to pull its tail into the trap.

Since latch elements 80 and 82 are formed on shield 52, it is necessary to provide clearance for movement of latch element 78 over the shield. Accordingly, as shown in FIG. 2, the upper edge of the shield is reduced in height at location 90, above latch elements 80 and 82.

The two molded parts of the trap, namely box 10 and closure 12 are substantially free of undercuts, and consequently can be molded by injection molding without difficulty. Since the opening at the top of the box extends substantially the full length of the box, and since the closure is hinged along a long edge of the box opening, the mold in which the box is formed need not be large in size.

The trap of FIGS. 1-7 can be molded from a wide variety of suitable plastic materials. However, relatively hard plastics such as poly(methyl methacrylate) are preferred as materials for traps designed in accordance with FIGS. 1-7, as they have a lesser tendency to warp than do softer materials such as polyethylene. Where the hard materials are used, however, in general the box and closure cannot be formed as a unit with an integral hinge between them. Accordingly, it is generally necessary to use a snap hinge as shown, or an equivalent hinge.

Figure 8:
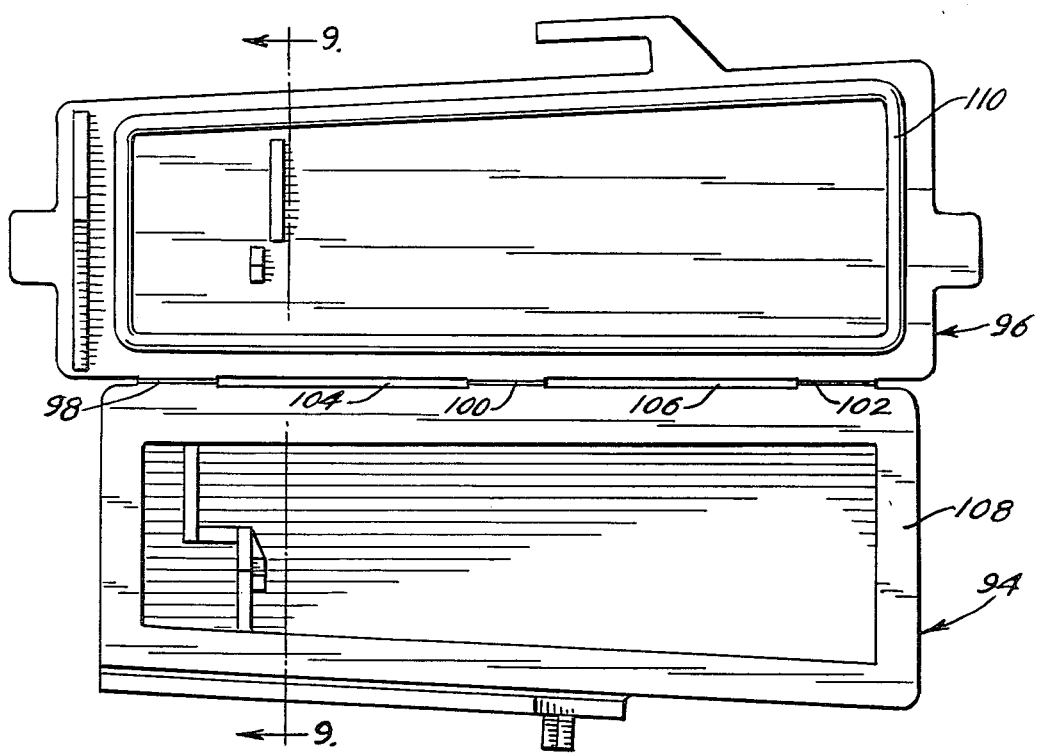
FIG. 8 is a top plan view of an alternative embodiment of the trap, showing the closure in a fully opened condition corresponding to the condition of the closure in FIG. 7.
Figure 9:
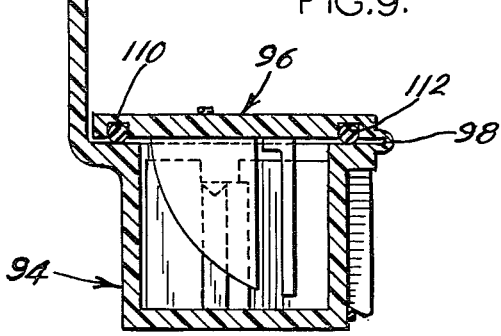
FIG. 9 is a vertical section taken on the plane 9—9 of FIG. 8, showing the closure in its fully closed condition.

FIGS. 8 and 9 show a trap having a generally similar design to that of FIGS. 1-7, but suitable for manufacture using softer plastics such as polyethylene. Box 94 and closure 96 are molded as a unit, the assembly being taken out of the mold with the closure in its open condition as shown in FIG. 8.

The principal differences between the trap in FIGS. 1-7 and the trap in FIGS. 8 and 9 are in the hinge configuration, and in the mechanism for sealing the closure at the top of the box. The hinge comprises a series of narrow hinge elements 98, 100 and 102 separated from one another by slots 104 and 106. The upper edges of the walls of the box have a wider sealing surface 108, adapted to be engaged by a rubber gasket 110 which is held in a groove 112 formed in closure 96. The rubber gasket insures an air-tight closure despite slight warpage in the soft plastic material of the box and closure. The structure and operation of the trap of FIGS. 8 and 9 are otherwise identical to those of the trap of FIGS. 1-7.

When the trap in accordance with the invention is used as a mousetrap, it has been found that the vertical walls of the box pose no obstacle whatever to a mouse attempting to reach the bait in the bait compartment. A mouse will simply climb over the portions of the walls near the end of the trap opposite the end at which the trigger mechanism is located, and will readily actuate the trigger bar in attempting to reach the bait. The trap kills the mouse by asphyxiation, and the trap along with the dead mouse within it can be easily disposed of.

When the trap is designed for larger animals, it may be desirable, for the sake of stability, to make the box somewhat wider in the direction transverse to the direction of elongation in order to prevent it from tipping over when the animal attempts to climb into it. The trap may, of course, be modified, by appropriate placement of the shield means, so that it can be used with the closure element resting on the floor and with the box poised above the closure element when the trap is in the set condition. Various other modifications can be made to the apparatus herein described without departing from the scope of the invention as defined in the following claims.

We claim:

1. An animal trap comprising:
   an elongated box having an opening extending substantially the full length of said box in the direction of elongation;
   means providing a closure of a size sufficient to close said opening substantially completely;
   hinge means connecting said box and said enclosure and arranged to allow said closure to swing from an open position in which an animal may enter the interior of said box to a closed position in which an animal within the box is substantially completely enclosed;
   means for urging said closure toward said closed position;
   animal-actuable trigger means located adjacent one end of the box for temporarily holding said closure in said open position against the action of said urging means, said trigger means being movable, when activated by an animal, to permit said closure to move to its closed position under the action of said urging means; and shield means secured to said trap for denying access to said trigger means to the animal except when the body of the animal is positioned so that, upon activation of the trigger, said closure is able to close under the action of said urging means and thereby enclose the animal within the enclosure;

in which said elongated box comprises five sides with four sides extending substantially in the same direction from a fifth side, said four sides comprising two opposite short sides and two opposite long sides, and said opening being located opposite the fifth side and defined by the free edges of said four sides, and in which said shield means comprises a shield member connected to and extending from one of said long sides in the direction away from the fifth side and extending longitudinally from a location adjacent said trigger means to an intermediate location between said short sides.

2. An animal trap according to claim 1 in which said hinge means connects a long edge of said closure to the free edge of the other of said long sides of the box, whereby said closure is arranged to swing about a hinge axis substantially parallel to the direction of elongation of said box.

3. An animal trap according to claim 1 including latch means for automatically latching said closure in said closed position when said trigger means is activated, said latch means comprising a first projection connected to said shield member and a second projection connected to said closure, said first and second projections having mutually engageable latching surfaces positioned for engagement when said closure is in said closed condition, at least one of said projections being resilient, and said projections also having mutually engageable camming surfaces arranged to engage each other during closing movement of said closure, said camming surfaces being arranged to effect movement of said resilient projection to allow said closure to move to its fully closed position.

4. An animal trap according to claim 1 including latch means comprising first and second projections connected to said shield member and a resilient third projection connected to said closure, said first projection having a latching surface engageable by said third projection when said closure is in a partially closed condition for preventing opening movement of said closure as a result of an opening force exerted on the closure by an animal within the box, and said second projection having a latching surface engageable by said third projection when said closure is in its closed position for preventing opening movement of said closure as a result of an opening force exerted on the closure by an animal within the box, said first and second projections including camming surfaces arranged to permit said resilient third projection to pass over said first and second projections during closing movement of said closure.

5. An animal trap according to claim 1 in which said shield member is integrally connected to said one of said long sides and including latch means comprising first and second projections integrally connected to said shield member and a resilient third projection connected to said closure, said first projection having a latching surface engageable by said third projection when said closure is in a partially closed condition for preventing opening movement of said closure as a result of an opening force exerted on the closure by an animal within the box, and said second projection having a latching surface engageable by said third projection when said closure is in its closed position for preventing opening movement of said closure as a result of an opening force exerted on the closure by an animal within the box, said first and second projections including camming surfaces arranged to permit said resilient third projection to pass over said first and second projections during closing movement of said closure, said box and substantially all parts integrally connected to said box being formed of moldable plastic and being substantially free of undercuts, and said first and second projections being offset from each other horizontally whereby said box and all parts integrally connected thereto can be readily removed from a mold.

6. An animal trap comprising:

an elongated box having an opening extending substantially the full length of said box in the direction of elongation;

means providing a closure of a size sufficient to close said opening substantially completely;

hinge means connecting said box and said enclosure and arranged to allow said closure to swing from an open position in which an animal may enter the interior of said box to a closed position in which an animal within the box is substantially completely enclosed;

means for urging said closure toward said closed position;

animal-actuable trigger means located adjacent one end of the box for temporarily holding said closure in said open position against the action of said urging means, said trigger means being movable, when activated by an animal, to permit said closure to move to its closed position under the action of said urging means; and shield means secured to said trap for denying access to said trigger means to the animal except when the body of the animal is positioned so that, upon activation of the trigger, said closure is able to close under the action of said urging means and thereby enclose the animal within the enclosure;

in which said elongated box comprises five sides with four sides extending substantially in the same direction from a fifth side, said four sides comprising two opposite short sides and two opposite long sides, and said opening being located opposite the fifth side and defined by the free edges of said four sides, in which said hinge means connects a long edge of said closure to the free edge of one of said long sides of the box whereby said closure is arranged to swing about a hinge axis substantially parallel to the direction of elongation of said box, and in which said shield means comprises a shield member connected to said closure adjacent said trigger means, said shield member extending from said closure to a location adjacent the free edge of the short side of the box adjacent the trigger means when said closure is in said open position, thereby denying access to said trigger means over the last-mentioned short side of the box.

7. An animal trap according to claim 6 in which said shield means comprises a second shield member connected to and extending from the other of said long sides in the direction away from said fifth side, and extending longitudinally from a location adjacent said trigger means to an intermediate location between said short sides.

8. An animal trap according to claim 6 in which said means for urging said closure toward said closed position comprises an elastic band connected between said box and said closure and extending, on the outside of said box, across the face of the short side of said box adjacent said trigger means.

9. An animal trap comprising:
an elongated box having an opening extending substantially the full length of said box in the direction of elongation;
means providing a closure of a size sufficient to close said opening substantially completely;
hinge means connecting said box and said enclosure and arranged to allow said closure to swing from an open position in which an animal may enter the interior of said box to a closed position in which an animal within the box is substantially completely enclosed;
means for urging said closure toward said closed position;
animal-actuable trigger means located adjacent one end of the box for temporarily holding said closure in said open position against the action of said urging means, said trigger means being movable, when activated by an animal, to permit said closure to move to its closed position under the action of said urging means;
shield means secured to said trap for denying access to said trigger means to the animal except when the body of the animal is positioned so that, upon activation of the trigger, said closure is able to close under the action of said urging means and thereby enclose the animal within the enclosure; and
including a latching member on said box and a cooperating latching member on said closure, at least one of said latching members being resilient, one of said latching members having first and second projections and the other of said latching member having a third projection, said first projection having a latching surface engageable by said third projection when said closure is in a partially closed condition for preventing opening movement of said closure as a result of an opening force exerted on the closure by an animal within the box, and said second projection having a latching surface engageable by said third projection when said closure is in its closed position for preventing opening movement of said closure as a result of an opening force exerted on the closure by an animal within the box, said first and second projections including camming surfaces arranged to permit said third projection to pass over said first and second projections during closing movement of said closure.

10. An animal trap comprising:
an elongated box having an opening extending substantially the full length of said box in the direction of elongation;
means providing a closure of a size sufficient to close said opening substantially completely;
hinge means connecting said box and said enclosure and arranged to allow said closure to swing from an open position in which an animal may enter the interior of said box to a closed position in which an animal within the box is substantially completely enclosed;
means for urging said closure toward said closed position;
animal-actuable trigger means located adjacent one end of the box for temporarily holding said closure in said open position against the action of said urging means, said trigger means being movable, when activated by an animal, to permit said closure to move to its closed position under the action of said urging means;
shield means secured to said trap for denying access to said trigger means to the animal except when the body of the animal is positioned so that, upon activation of the trigger, said closure is able to close under the action of said urging means and thereby enclose the animal within the enclosure; and
in which said trigger means comprises a trigger bar integrally connected at one of its ends to said closure and detent means connected to said box, said detent means being engageable by the other end of said trigger bar for holding said closure in its open position and said bar being sufficiently flexible to disengage said detent means when activated by an animal.

11. An animal trap comprising:
an elongated box having an opening extending substantially the full length of said box in the direction of elongation;
means providing a closure of a size sufficient to close said opening substantially completely;
hinge means connecting said box and said enclosure and arranged to allow said closure to swing from an open position in which an animal may enter the interior of said box to a closed position in which an animal within the box is substantially completely enclosed;
means for urging said closure toward said closed position;
animal-actuable trigger means located adjacent one end of the box for temporarily holding said closure in said open position against the action of said urging means, said trigger means being movable, when activated by an animal, to permit said closure to move to its closed position under the action of said urging means;
shield means secured to said trap for denying access to said trigger means to the animal except when the body of the animal is positioned so that, upon activation of the trigger, said closure is able to close under the action of said urging means and thereby enclose the animal within the enclosure; and
having a bait compartment located between said trigger means and said one end of said box, said trigger means comprising a trigger bar connected at one of its ends to said closure and detent means connected to said box, said detent means being engageable by the other end of said trigger bar for holding said closure in its open position and said bar being sufficiently flexible to disengage said detent means when activated by an animal, wherein said shield means is positioned to deny access to said bait compartment from the exterior of said box, and including additional shield means for denying access to said bait compartment to an animal within said box except by activation of said trigger bar.

12. An animal trap according to any one of claims 1, 2, 6, 7, 8, 3, 9, 4, 5 or 11 in which the fifth side constitutes a bottom of the box, and the four sides extend upwardly from said bottom.

* * * * *